Dec. 12, 1967 A. CHAMPION 3,357,725
PIPE JOINTS AND SWAGING TOOLS THEREFOR
Filed June 1, 1965 3 Sheets-Sheet 1

INVENTOR
Alfred Champion
BY
Cushman Darby Cushman
ATTORNEYS

Dec. 12, 1967  A. CHAMPION  3,357,725
PIPE JOINTS AND SWAGING TOOLS THEREFOR
Filed June 1, 1965  3 Sheets-Sheet 2

INVENTOR
Alfred Champion
BY
Cushman, Darby & Cushman
ATTORNEYS

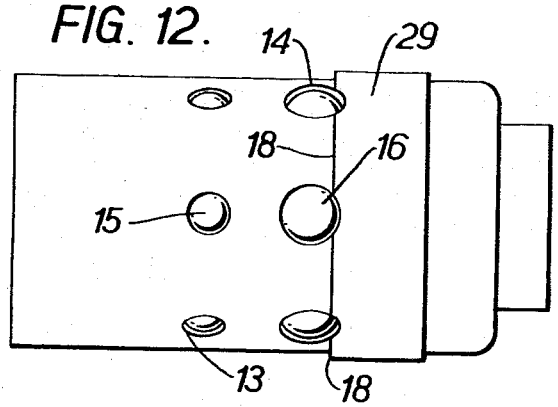
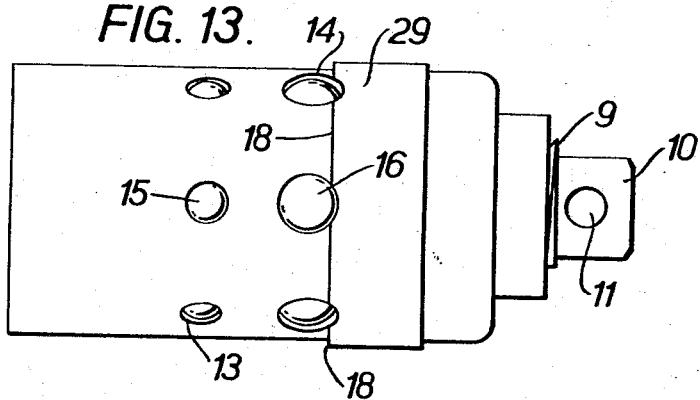
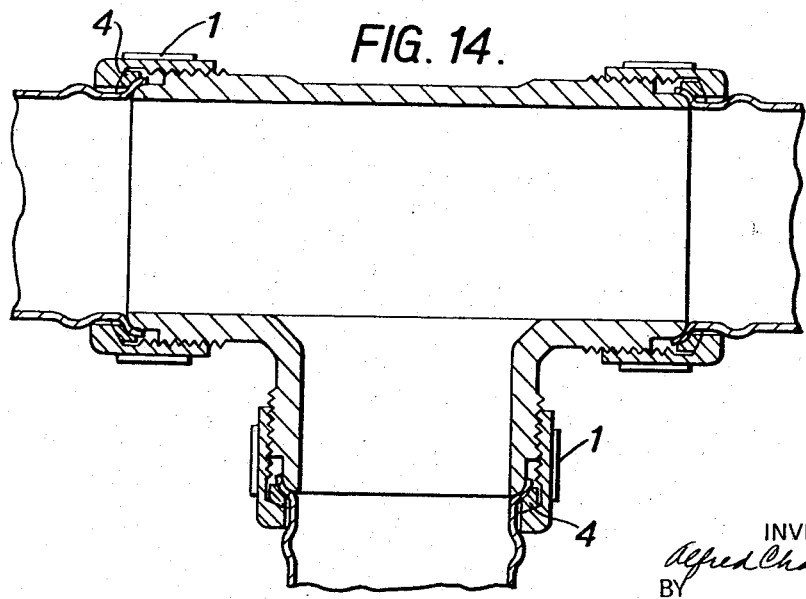

United States Patent Office 3,357,725
Patented Dec. 12, 1967

3,357,725
PIPE JOINTS AND SWAGING
TOOLS THEREFOR
Alfred Champion, c/o Kings Langley Engineering Company Limited, Station Road, Kings Langley, England
Filed June 1, 1965, Ser. No. 460,293
4 Claims. (Cl. 285—353)

This invention relates to pipe couplings and to swaging tools for use in making the pipe couplings.

According to a feature of the present invention we provide a pipe joint comprising a threaded union secured in position on one pipe end by swaging the pipe end, a threaded nut secured in postiion on the other pipe end by swaging the pipe end, the threaded union being in screw threaded engagement with the threaded nut and a shaped olive in the form of a ring (e.g., an annulus) disposed between the nut and the union to complete the joint.

In order that the invention may be more clearly understood and readily carried into effect reference is directed to the accompanying drawings given by way of example and in which:

FIGURE 12 is a view of the casing of the mandrel.

FIGURE 13 is an asembled view of the swaging tool in elevation, and

FIGURE 14 is a side view of a T-joint according to the invention.

Figure 1:
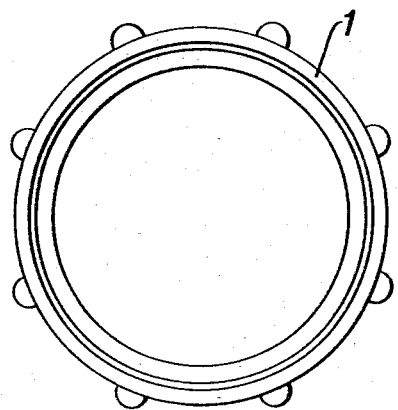
FIGURE 1 is an end view of an outer nut used in making the joint.
Figure 2:
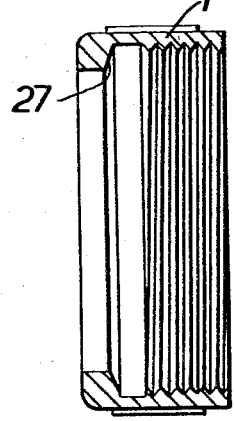
FIGURE 2 is a side view of the outer nut partly in section on the line S—L of FIGURE 1.
Figure 3:
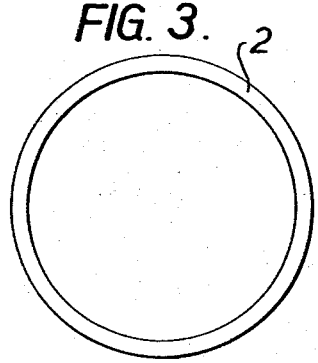
FIGURE 3 is an end view of an olive used in making the joint.
Figure 4:
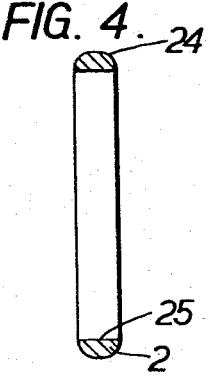
FIGURE 4 is a section of the olive on the line 3—3 of FIGURE 3.
Figure 5:
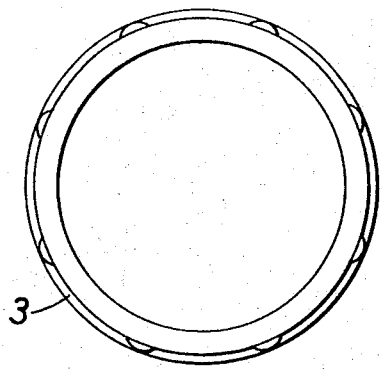
FIGURE 5 is an end view of an inner nut or union used in making the joint.
Figure 6:
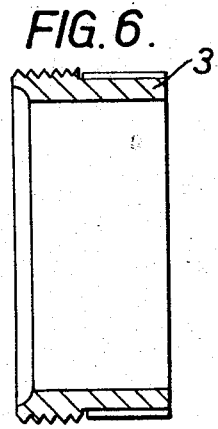
FIGURE 6 is a side view of the inner nut partly in section on the line S—L of FIGURE 5.
Figure 7:
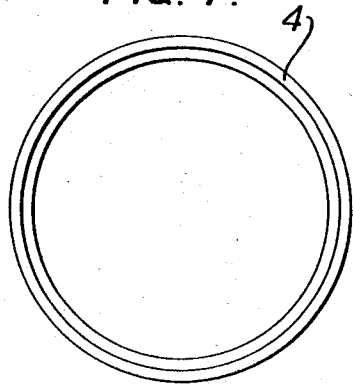
FIGURE 7 is an end view of a nut ring for the outer nut.
Figure 8:
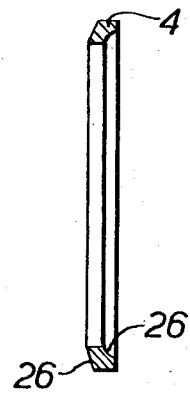
FIGURE 8 is a section of the nut ring on the line 7—7 of FIGURE 7.
Figure 9:
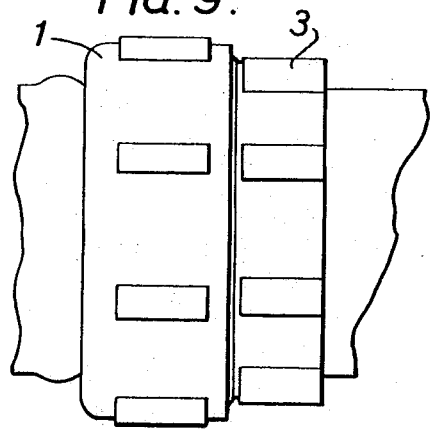
FIGURE 9 is an assembled view of a pipe joint in elevation.
Figure 10:
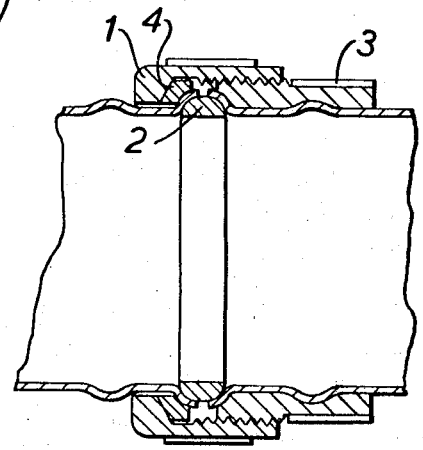
FIGURE 10 is an assembled view of a pipe joint in longitudinal section.
Figure 11:
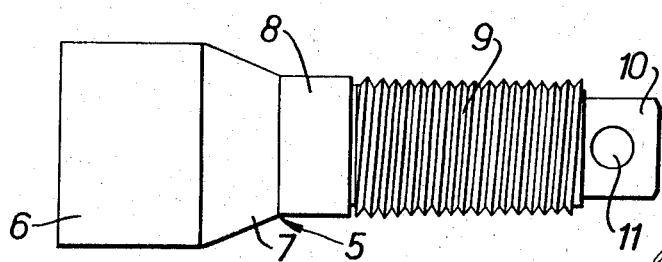
FIGURE 11 is a view of the mandrel of the swaging tool.

In the drawings the pipe joint comprises an outer nut 1, a shaped olive 2 and an inner nut or union 3. The outer nut 1 is provided with a nut ring 4 which is disposed inside the nut 1. The specially designed swaging tool comprises a mandrel 5 which has a wide diameter section 6, an inclined section 7, a narrow diameter section 8, a screw threaded part 9 and a shank 10 with an opening 11 to receive a tommy-bar. The casing 12 of the swaging tool has two rows of openings 13, 14, through which small balls 15 and larger balls 16 may be caused to project.

In order to assemble the parts of the joint and to complete a water-tight connection the following steps are carried out.

(1) Place an outer nut 1 and a nut ring 4 of the correct size over the end of pipe 17.

(2) Insert a swaging tool, for example the tool to be described hereinafter, into the pipe 17.

(3) Bring the pipe end up to a shoulder or stop 18 on the swaging tool so that the tool is properly positioned.

(4) Bring the nut 1 up to the shoulder 18 on the tool.

(5) Operate the swaging tool to form a first or outer ring or swage 19 in the pipe 17 in a position to assist in holding the nut 1 in its correct position on the pipe 17. This swage 19 may be under the nut 1 or just behind it and it is effective to assist in preventing the nut 1 slipping away from the joint along the pipe 17 and it also positions the tool for the formation of a second swage 20. This swage 20 and the swage 19 are formed by the rings of balls 15 and 16 in the swaging tool. The swage rings 19 and 20 are formed by manipulating the swaging tool in a manner to be hereinafter described in such a way that the balls 15 and 16 project through the holes or openings 13 and 14 so that as the swaging tool is turned relatively to the pipe the balls 15 and 16 make a swaged ring in the ductile material of the tube.

(6) Leave the balls 15 of the swaging tool in the swage ring 19 already formed in the pipe 17 so that the swaging tool is correctly positioned on the pipe 17 and then operate the second set of balls 16 in the swaging tool to form the swage 20 in the open end of the pipe.

(7) Place a union 3 of the correct size over the end of the other pipe 21.

(8) Insert the swaging tool into the pipe 21.

(9) Bring the union 3 up to the shoulder 18.

(10) Bring the tool up to the shoulder 18.

(11) Operate the tool to form a first or outer swage 22 to assist in holding the union 3 in position and to hold the tool.

(12) Leave the balls 15 of the tool in the first swage 22 and form a second swage 23 in the open pipe end.

(13) Place the olive or ring 2 in postiion between the two swaged pipe ends 17 and 21, engage the nut 3 and the union 4 and screw up tightly. It will be understood that the nut 3 and/or the union 4 must be free to rotate relatively to the ends of the pipes 17 and 21 to permit the nut 3 and the union 4 to be screwed together without turning either of the pipes 17 or 21.

The olive or ring 2 used in the formation of the joint is shaped or curved on the outside at 24 to mate snugly with the swages 20 and 23 in the pipe ends and is flat at 25 on the inside to make a more or less unimpeded inner surface at the pipe joint.

The nut ring 4 is shaped at 26 to an incline surface to match an inclined surface 27 on the inside of the outer nut 1 so that the nut ring 4 can fit snugly inside the nut 1. The purpose of the nut ring is to prevent the inner wall of the outer nut 1 cutting into the swage ring 19 when the parts of the joint are tightened up and to ensure that the nut ring 4 seats correctly on the swage ring 19. The nut ring 4 has a concave curved inner surface or contour 26 which matches the convex outer surface of the swage ring 19.

The invention also includes a special form of swaging tool for use in the preparation of the joint. The swaging tool comprises the mandrel 5 and the casing 12, the mandrel 5 being in screw threaded engagement with the casing 12.

The casing 12 is of tubular formation, completely open at one end which has a smooth internal bore 27 and partially closed at the other end to terminate in an internally screw-threaded part 28 for engagement with the mandrel. The casing 12 has the two circumferentiated rows of radial holes 13 and 14 in each of which a swaging ball 15 or 16 is disposed and the casing 12 also has an annular outer ring 29 of increased diameter to provide the shoulder 18 referred to above.

The mandrel 5 comprises the section 6 of large diameter and the section 8 of small diameter connected by a frusto-conical section or incline 7 and then the screw-threaded part 9 to engage with the casing 12 and finally the smooth end part or shank 10 with the hole 11 therethrough to receive a tommy bar by means of which the mandrel 5 may be turned relatively to the casing 12.

In operation the swaging tool is inserted into a pipe end, e.g. the pipe end 17 until the shoulder 18 on the tool casing 12 abuts against the pipe end 17 and then the nut 4 whch has been slipped over the pipe end is brought up to the shoulder 18. At this stage both rings of balls 15 and 16 are in their retracted position. The mandrel 5 is then turned by means of the tommy bar relatively to the casing 12 so that the mandrel 5 is drawn inwardly of the casing. As the inclined section 7 of the mandrel surface reaches the outer ring of balls 15 these balls 15 begin to ride up the incline and so they are pushed outwardly until they project through their holes 13. The friction between the balls 15 and the pipe 17 is enough to make the whole tool turn and so a deepening swaged ring 19 is made in the pipe 17. This ring 19 is deepened until the balls 15 begin to ride on flat part 6 of large diameter whereupon the balls 15 are not pushed out any further and the swaged ring 19 is not made any deeper. The engagement of these balls 15 with the ring 19 holds the tool in position while the inner row of balls 16 swage the outer end of the pipe by moving up the inclined surface 7 as in the case of the first-mentioned ring of balls.

Preferably the inner ring of holes 13 in the casing 12 are larger than the outer ring of holes 14 and the balls 16 are correspondingly larger. Conveniently the holes 13 and 14 may be burred over to prevent the balls 15, 16 coming right out of the holes 13, 14.

In this specification the terms inner and outer with respect to the rings 15, 16 of balls and to the swaged rings are used relatively to the transverse centre line of a joint between two pipes.

The above description relates to a straight through joint but naturally a more complicated connection such as a T-joint can be made by using a T-shaped or other connecting piece 28 incorporating the required number of unions 29 for connection to nuts 30 secured to the pipe ends 31, 32 and 33.

I claim:

1. A pipe joint comprising: a first pipe; an internally threaded outer nut received on the first pipe near one end of the first pipe, the nut having a radially inwardly directed circumferential flange means thereon terminating adjacent the exterior of the first pipe and having opposite generally radial faces; a first outwardly swaged radially inwardly concave circumferential ring on the first pipe at said one end; a second outwardly swaged circumferential ring on the first pipe spaced from said one end and being immediately adjacent the generally radial face of said flange which lies furthest from said one end, whereby said nut is retained against substantial movement axially of the first pipe by the two outwardly swaged rings; a second pipe; an exteriorly threaded inner union received on the second pipe near one end of the second pipe; a first outwardly swaged radially inwardly concave circumferential ring on the second pipe at said one end; a second outwardly swaged circumferential ring on the second pipe spaced from said one end; the two outwardly swaged rings on said second pipe engaging the union at axially spaced regions of the union and restraining the union against substantial axial movement along the second pipe; a ring shaped annulus disposed between the nut and the union; said annulus having a radially exteriorly convex surface coextensively engaging both said first outwardly swaged ring on said first pipe and said first outwardly swaged ring on said second pipe; at least one of said nut and said union being angularly rotatably mounted on the respective pipe; said nut threadedly engaging said union securing said first pipe to said second pipe; wherein the first outwardly swaged ring has a convex backside, and the face of said flange which lies nearest said first pipe one end flares radially outwardly toward said first pipe one end; and said joint further includes a nut ring received within said nut between the interior thereof and said first pipe; said nut ring having a first end surface complementary curved respecting the radially outwardly flared flange face and extensively engaging said radially outwardly flared flange face; said nut ring also having a second, opposite end surface complementarily curved respecting the backside of said first outwardly swaged circumferential ring on the first pipe and extensively engaging the convex backside of said first outwardly swaged circumferential ring.

2. A pipe joint comprising; a first pipe; an internally threaded outer nut received on the first pipe near one end of the first pipe, the nut having a radially inwardly directed circumferential flange means thereon terminating adjacent the exterior of the first pipe and having opposite generally radial faces; a first outwardly swaged radially inwardly concave circumferential ring on the first pipe at said one end; a second outwardly swaged circumferential ring on the first pipe spaced from said one end and being immediately adjacent the generally radial face of said flange which lies furthest from said one end, whereby said nut is retained against substantial movement axially of the first pipe by the two outwardly swaged rings; a second pipe; an exteriorly threaded inner union received on the second pipe near one end of the second pipe; a first outwardly swaged radially inwardly concave circumferential ring on the second pipe at said one end; a second outwardly swaged circumferential ring on the second pipe spaced from said one end; the two outwardly swaged rings on said second pipe engaging the union at axially spaced regions of the union and restraining the union against substantial axial movement along the second pipe; a ring shaped annulus disposed between the nut and the union; said annulus having a radially exteriorly convex surface coextensively engaging both said first outwardly swaged ring on said first pipe and said first outwardly swaged ring on said second pipe; at least one of said nuts and said unions being angularly rotatably mounted on the respective pipe; said nut threadedly engaging said union securing said first pipe to said second pipe; wherein said union extends axially beyond said second outwardly swaged ring on said second pipe; said union having means defining a circumferential radially inwardly opening recess in the bore thereof; said second outwardly swaged ring being disposed within said recess.

3. A pipe joint comprising: a first pipe; an internally threaded outer nut received on the first pipe, the nut having a radially inwardly directed circumferential flange means thereon terminating adjacent the exterior of the first pipe, and having opposite generally radial faces; a first outwardly swaged radially inwardly concave circumferential ring on the first pipe at said one end; a second outwardly swaged circumferential ring on the first pipe spaced from said one end and being immediately adjacent the generally radial face of said flange which lies furthest from said one end, whereby said nut is retained against substantial movement axially of the first pipe by the two outwardly swaged rings; a tubular connector; means defining a radially outwardly convex circumferential surface on the connector at one end thereof; exteriorly screw threaded means on the connector near said one end threadably engaging said interiorly threaded nut securing said first pipe to said connector; a nut ring received within said nut between the interior thereof and said first pipe; sad convex circumferential surface on the connector extensively engaging the first outwardly swaged ring on the first pipe.

4. The pipe joint of claim 3 wherein the first outwardly swaged ring has a convex backside, and the face of said flange which lies nearest said first pipe, one end flares radially outward toward said first pipe one end; said nut ring having a first end surface complementarily curved respecting the radially outwardly flared flange face and extensively engaging said radially outwardly flared flange face; said nut ring also having a second, opposite end surface complementarily curved respecting the backside of said first outwardly swaged circumferential ring, on the first pipe and extensively engaging the convex backside of said first outwardly swaged circumferential ring.

References Cited

UNITED STATES PATENTS

| | | | |
|---|---|---|---|
| 2,450,581 | 10/1948 | Couty | 285—382.5 X |
| 2,485,960 | 10/1949 | Donahue | 285—382.5 |
| 2,557,930 | 6/1951 | Bard | 285—382.5 |
| 2,788,833 | 4/1957 | Arnold | 285—382.5 X |
| 3,207,537 | 9/1965 | Kimbrell et al. | 285—353 |
| 3,258,278 | 6/1966 | Miller | 285—353 |

CARL W. TOMLIN, *Primary Examiner.*

W. L. SHEDD, *Assistant Examiner.*